(12) United States Patent
Binding et al.

(10) Patent No.: US 7,541,913 B1
(45) Date of Patent: Jun. 2, 2009

(54) METHOD FOR TRACKING CONTAINERS USING A LOW-RATE WIRELESS PERSONAL AREA NETWORK SYSTEM

(75) Inventors: Carl Binding, Rueschlikon (CH); Francois B. Dolivo, Waedenswil (CH); Reto J. Hermann, Buttikon (CH); Dirk Husemann, Einsiedeln (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/103,775

(22) Filed: Apr. 16, 2008

Related U.S. Application Data

(63) Continuation of application No. 11/939,093, filed on Nov. 13, 2007, now Pat. No. 7,378,960.

(51) Int. Cl.
*H04Q 5/22* (2006.01)
(52) U.S. Cl. .............. 340/10.1; 340/539.13; 340/539.1; 340/572.1; 340/3.6; 340/5.92; 340/5.73; 340/825.49; 235/384; 235/385; 342/357.06; 342/357.09; 342/357.1
(58) Field of Classification Search ............ 340/539.13, 340/539.1, 572.1, 3.6, 5.92, 5.73, 825.49; 235/384, 385; 342/357.06, 357.09, 357.16
See application file for complete search history.

(56) References Cited

U.S. PATENT DOCUMENTS

| | | | |
|---|---|---|---|
| 6,972,682 B2 | 12/2005 | Lareau et al. | |
| 7,221,750 B2 | 5/2007 | Brahmbhatt et al. | |
| 2004/0203377 A1 | 10/2004 | Eaton et al. | |

OTHER PUBLICATIONS

Kamran Javed, ZigBee Suitability for Wireless Sensor Networks in Logistic Telemetry Applications, Hamsted University; School of Information Science, Computer, and Electrical Engineering, Jan. 2006.

*Primary Examiner*—Brian A. Zimmerman
*Assistant Examiner*—Vernal U Brown
(74) *Attorney, Agent, or Firm*—Cantor Colburn LLP; Peter Klett

(57) ABSTRACT

A method for tracking a plurality of containers each joined to an electronic tracking device having routing capabilities and a WPAN-enabled radio receiver/transmitter configured to attempt to connect to a pre-configured WPAN upon being activated comprises activating the radio receiver/transmitter of each tracking device joined to a container being loaded onto a cargo vessel; receiving an indication from each tracking device that fails to connect to the WPAN; intermittently performing a network scan to locate each WPAN-connected tracking device; intermittently configuring the WPAN to include each WPAN-connected tracking device in a hybrid tree-mesh network topology; intermittently configuring routing information stored on each WPAN-connected tracking device to maintain mutual communication with each WPAN-connected tracking device and enable mutual communication between each WPAN-connected tracking device; receiving transport-related data from each WPAN-connected tracking device; transmitting the transport-related data to a control station through a LAN on the vessel; broadcasting a request to be routed between the WPAN-connected tracking devices in a depth-first traversal of the network topology that directs each WPAN-connected tracking device to enter a low-power mode when the depth-first traversal backtracks from the tracking device; and receiving an acknowledgment of the request communicated from each WPAN-connected tracking device when the tracking device enters the low-power mode.

1 Claim, 7 Drawing Sheets

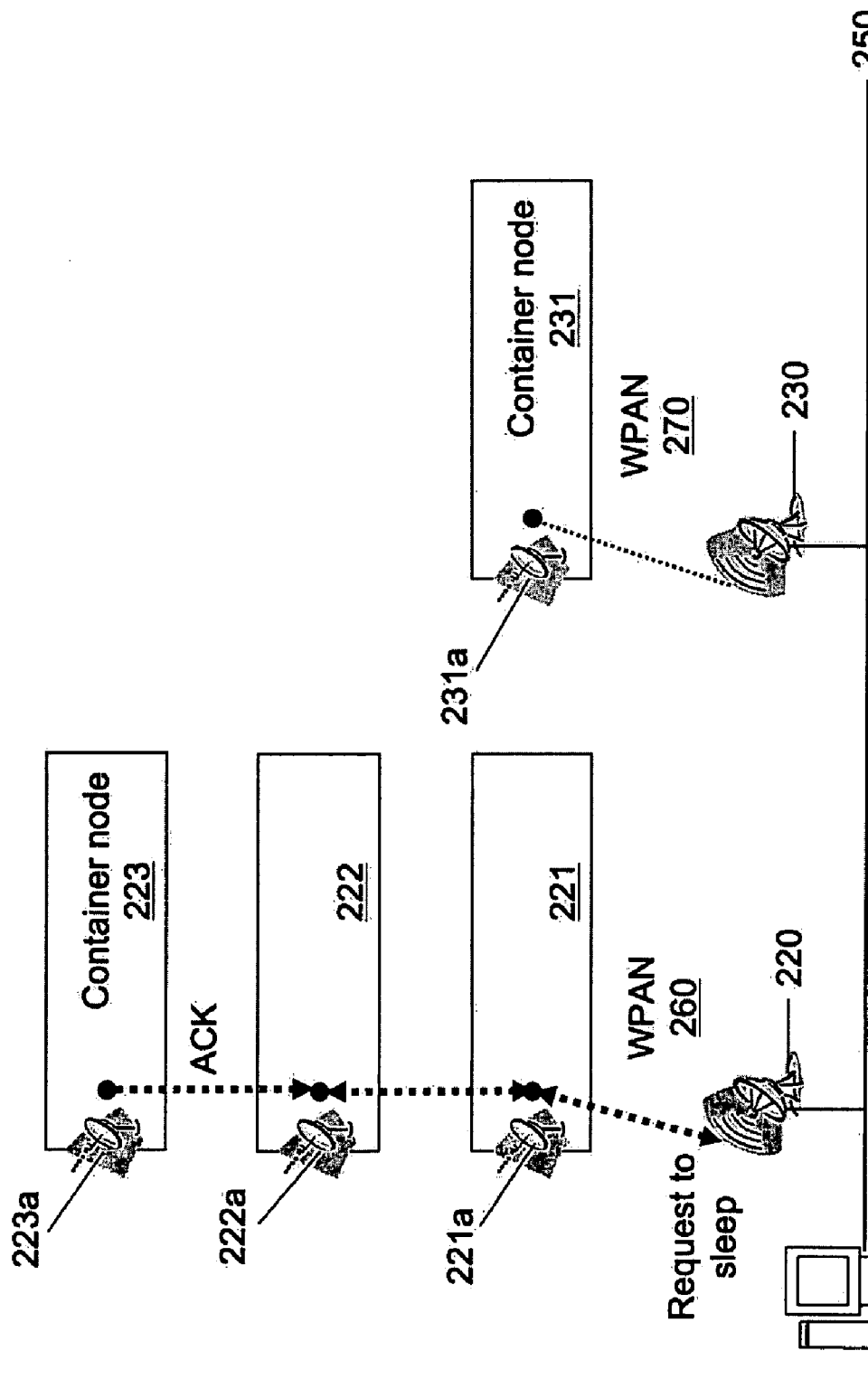

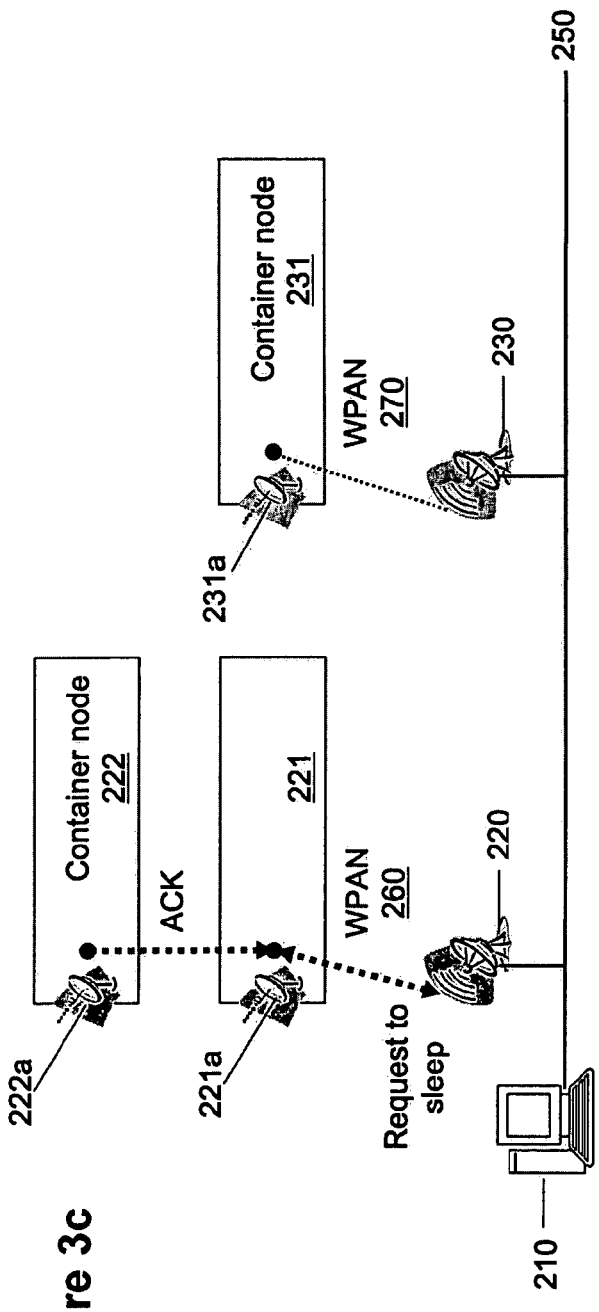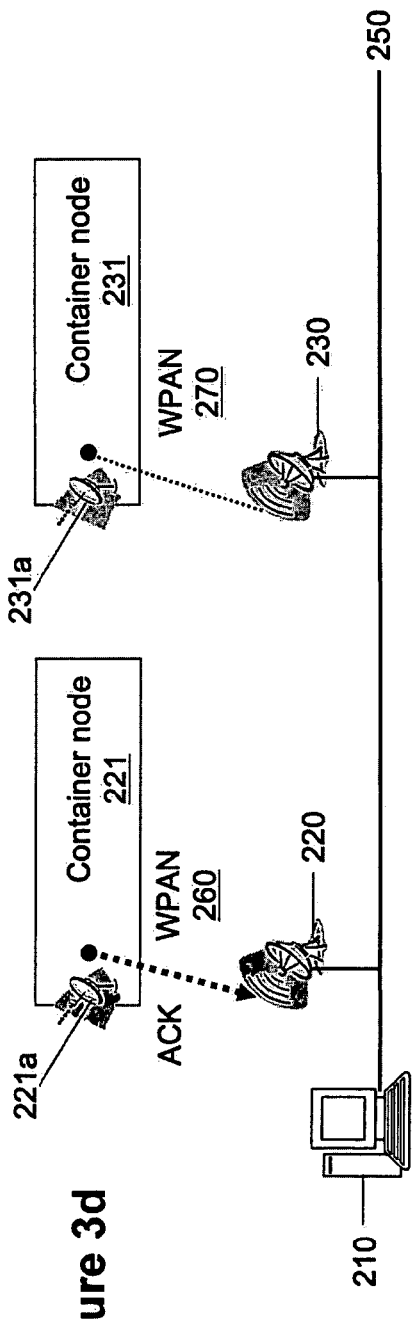

METHOD FOR TRACKING CONTAINERS USING A LOW-RATE WIRELESS PERSONAL AREA NETWORK SYSTEM

CROSS-REFERENCE TO RELATED APPLICATION

This application is a continuation of U.S. patent application Ser. No. 11/939,093, filed Nov. 13, 2007, the disclosure of which is incorporated by reference herein in its entirety.

BACKGROUND OF THE INVENTION

1. Field of the Invention

Exemplary embodiments of the present invention relate to cargo container tracking, and more particularly to the use of a low-rate personal area network system for tracking containers.

2. Description of Background

The fragmentation of the logistics industry makes it nearly impossible to track shipments continually from the manufacturer to the shelf. This because many of the current logistics involved in the shipping of packaged merchandise involve enormous levels of complexity, dated processes that generate lengthy paper trails, and limited levels of traceability and security. Information gaps arise, creating delays, high costs, and a limited ability to secure cargo throughout the entire supply chain. Moreover, security experts have warned of doomsday scenarios involving unchecked containers that may harbor terrorists, explosives, or other hazardous materials. As a result, improving the quality of container tracking for packaged merchandise in transit across trade lanes and improving the security of transported goods in global supply chain operations are increasingly being investigated in the effort to enable globally integrated business practices.

While container tracking has traditionally been performed passively, active tracking units, such as IBM's TREC (Tamper-Resistant Embedded Controllers) or FELA's CarLoc system, are still relatively new. TREC is a technology utilizing intelligent real-time tracking devices that are fitted to cargo containers and designed to withstand the environment they operate in. Unlike typical passive tags that collect data only, the wireless TREC devices incorporate significant processing power, enabling them to instantly receive and send data. The devices automatically collect information on each container, such as physical location based on its built-in global positioning system (GPS), environmental parameters such as temperature, air pressure, and humidity, and sensory readings such as shock or acceleration to detect intrusion. With its built-in GPS, a TREC device can be used to create a complete location history and alert in virtual real-time when a shipment strays from its planned route.

A fundamental problem for these emerging tracking devices is power-efficiency because these devices can only be powered by batteries or accumulators for dry good containers. To lengthen the service cycles of such devices and their power sources, power consumption must be kept to a minimum. In attempting to achieve this, it is important that certain transitions in a container's journey be detected. In particular, the loading of the container onto departing ocean-bound vessels is of interest because, during the ocean leg of a trade lane, there is a reduced security risk, the location of the container is known (on the vessel), and the tracking device is idle because it is not able to easily communicate using terrestrial or satellite communication. As a result, the tracking device can be operated in a low-power sleep or stand-by mode to prolong battery life. Accordingly, it is desirable to provide a mechanism for container load detection that is accurate, reliability, and becomes detectable on the vessel onto which a given container is loaded.

SUMMARY OF THE INVENTION

The shortcomings of the prior art can be overcome and additional advantages can be provided through exemplary embodiments of the present invention that are related to a method for tracking a plurality of containers loaded onto a cargo vessel using a pre-configured low-rate wireless personal area network (WPAN). Each container is joined to an electronic tracking device provided with routing capabilities and a WPAN-enabled radio receiver/transmitter. Each electronic tracking device is configured to attempt to connect to the WPAN upon being activated. The method comprises activating the radio receiver/transmitter of each electronic tracking device joined to a container of the plurality of containers as the container is being loaded onto the cargo vessel; receiving an indication from each electronic tracking device that fails to connect to the WPAN upon being activated; intermittently performing a network scan to locate each electronic tracking device that is connected to the WPAN; intermittently configuring the WPAN to include each electronic tracking device that is connected to the WPAN in a hybrid tree-mesh network topology; intermittently configuring routing information stored on each electronic tracking device that is connected to the WPAN to maintain mutual communication with each electronic tracking device that is connected to the WPAN and enable mutual communication between each electronic tracking device that is connected to the WPAN using the routing capabilities of the electronic tracking devices; receiving GPS-recorded position data, environmental parameter data, and sensory reading data from each electronic tracking device that is connected to the WPAN; transmitting the GPS-recorded position data, environmental parameter data, and sensory reading data to a control station of the cargo vessel through a local area network on the cargo vessel; broadcasting a request to the WPAN to be routed between the electronic tracking devices connected to the WPAN in a depth-first traversal of the network topology, the request directing each electronic tracking device that is connected to the WPAN to enter a low-power mode when the depth-first traversal backtracks from the electronic tracking device; and receiving an acknowledgment of the request communicated from each electronic tracking device that is connected to the WPAN when the electronic tracking device enters the low-power mode.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIGS. 3a-3d are block diagrams illustrating an example procedure of performing a depth-first traversal of a WPAN of the exemplary WPAN system of FIG. 2b to put the container nodes into sleep mode.

Figure 1:
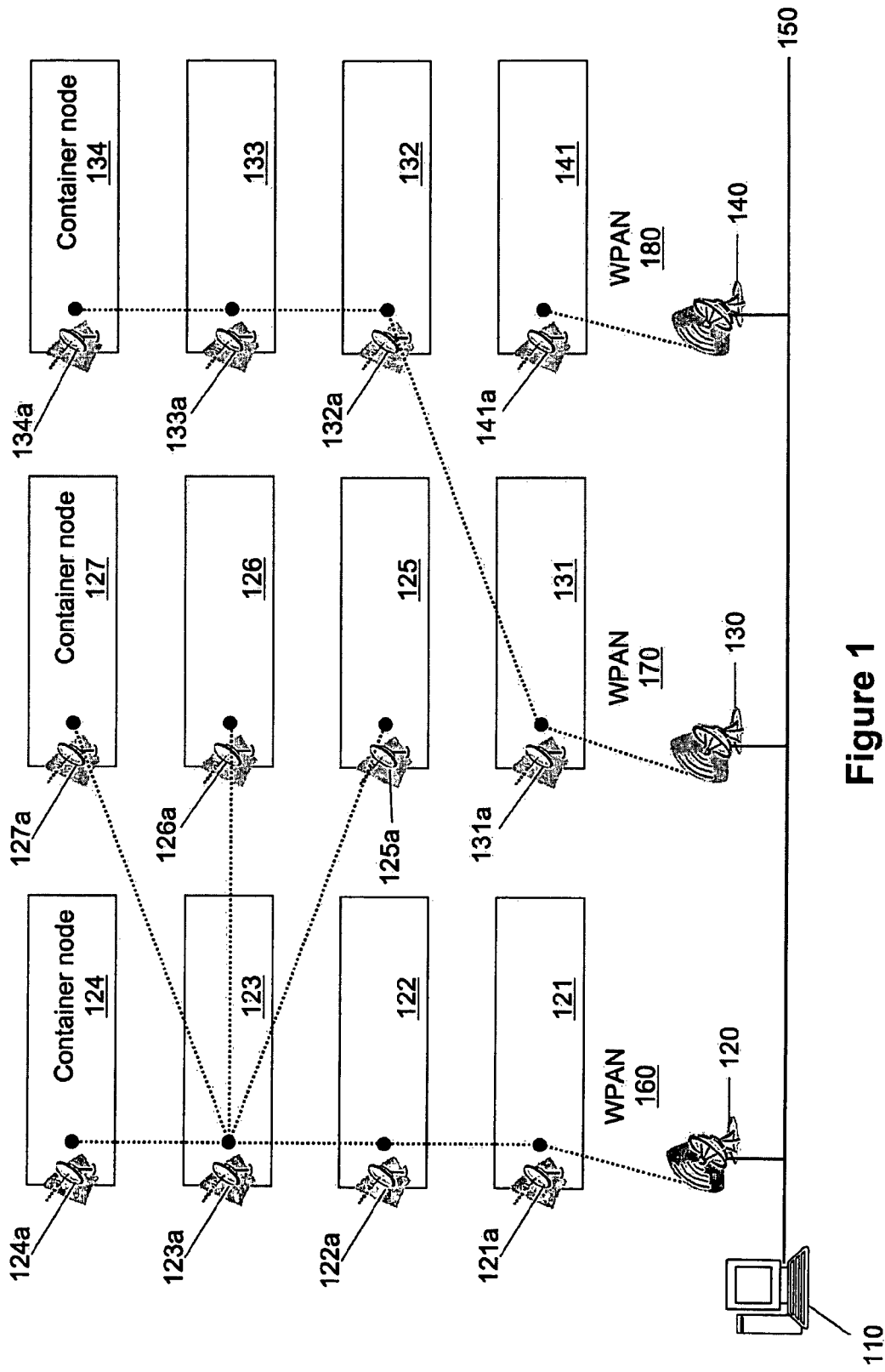
FIG. 1 is a block diagram illustrating an overall network architecture of an exemplary embodiment of a WPAN system in a shipping container environment in accordance with the present invention.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to utilize a low-rate wireless personal area network (WPAN) system to establish communication between a vessel and the containers that are loaded onto the vessel. A WPAN is a wireless computer network used for communication among nearby computer devices that can be made possible with network technologies such as the Infrared Data Association (IrDA, which defines physical specifications and communications protocol standards for the short-range exchange of data over infrared light), Bluetooth, and Ultra-wideband (UWB, which is a radio technology that can be used for short-range high-bandwidth communications by using a large portion of the radio spectrum in a way that does not interfere with other, more traditional "narrow band" uses). WPANs offer a wide variety of data rates, low power consumption, and are supported by several transmission technologies.

In exemplary embodiments, the WPAN system can be arranged or mapped according to protocols for a tree-shaped mesh network topology to signify the way in which the intelligent devices in the network, or nodes, view their logical relations to one another. In a tree (or hierarchical) network topology, a central "root" node (the top level of the hierarchy) is connected to one or more other nodes that are one level lower (that is, the second level of the hierarchy). For the connection between each of the second level nodes and the top-level root node, a point-to-point link is provided. Each of the second level nodes may also have one or more other nodes that are one level lower (that is, the third level of the hierarchy) that are each connected to the corresponding second level nodes with a point-to-point link. The hierarchy of the tree is symmetrical, with each node in the network having a fixed number of nodes, referred to as the "branching factor" of the hierarchical tree connected to it at the next lower level in the hierarchy. In a mesh network topology, all or some of the nodes of the network are connected to more than one other node in the network with a point-to-point link. That is, there are at least two nodes with two or more paths between them to provide redundant paths for continuous connections and reconfiguration around broken or blocked paths that can be used in case the link providing one of the paths fails. As a result, a very reliable network is formed. A tree-shaped mesh network topology is a hybrid network topology that is a combination of the tree network topology with a mesh portion of the topology that includes redundant or alternate connections between some of the nodes in the network. Without the mesh aspect, the failure of a link between any peripheral node and its root node would result in the isolation of that peripheral node from all others.

In exemplary embodiments, the WPAN system can include container tracking devices joined to container to form container nodes and at least one vessel- or container ship-based base station, or coordinator. The base station(s) can be implemented as a low power radio receiver/transmitter that serves as the hub(s) of the WPAN system on the vessel and can provide a gateway between a wired network and the wireless personal area network(s). In exemplary embodiments, the base station can include a wireless router, and can be implemented to communicate through broadcast (the delivery of information to every device on the network), multicast (the delivery of information to a group of destinations simultaneously using the most efficient strategy to deliver the messages over each link of the network only once, creating copies only when the links to the destinations split), or unicast (the sending of information to a single destination) with each tracking device that actively joins the network as a container node. This can allow for association of the vessel with each container node, the tracking of each container that is loaded onto the vessel using its tracking device, and the ability to inform the tracking devices about specific events, such as when the vessel leaves harbor, which can be used to cause the tracking device to enter a low-power sleep or stand-by mode.

Referring now to FIG. 1, a block diagram illustrating an overall network architecture of an exemplary embodiment of a WPAN system in a shipping container environment in accordance with the present invention is provided. WPAN system 100 includes a vessel control station 110 in communication with a number of vessel base stations 120, 130, 140 through a vessel local area network (LAN) 150. In exemplary embodiments, LAN 150 can consist of a vessel control station 190 that monitors and exercises control over WPAN system 100 and one or more vessel base stations linked to the vessel control station and also linked to each other using, for example, a router. In exemplary embodiments, vessel control station can be connected to a higher-level, integrated network that enables accredited supply chain participants (for example, manufacturers, retailers, logistics providers, carriers, and governments) to access relevant transport-related data about the containers being shipped on the vessel. The information gathered can be connected to decentralized databases where each participant owns their own content, and a service oriented architecture allows users to share information in virtual real-time. For example, the information could be used for timely detection of unauthorized container dumping, intrusion, or opening, and real-time tracking of container movements.

Vessel base station 120 is in communication with container nodes 121, 122, 123, 124, 125, 126, and 127 through a first WPAN 160, vessel base station 130 is in communication with container nodes 131, 132, 133, and 134 through a second WPAN 170, and vessel base station 140 is in communication with container node 141 through a third WPAN 180. In exemplary embodiments such as that of FIG. 1, a WPAN system for a vessel may operate multiple base stations (or coordinators) that each form an independent WPAN for reasons of coverage of the entire deck zone of the vessel.

Each container node has joined thereto an active electronic tracking device (denoted by the reference numeral for the corresponding container followed by the letter 'a'; for example, tracking device 122a is joined to container 122). The tracking devices can include, for example, IBM's TREC or FELA's CarLoc systems, and are each equipped with a WPAN-enabled radio receiver/transmitter, as well as a GPS tracking unit that can be used to determine the precise location of the container to which it is joined and to record the position of the container at regular intervals. Each tracking device can use its radio transmitter to transmit the GPS-recorded position data to the base station for the particular WPAN of which it is a member, and the particular WPAN can in turn transmit the container position data to vessel control station 110.

In exemplary embodiments, when a new container is loaded onto the vessel, a tracking device can be joined to the new container to form a new container node, and the device's GPS unit can begin recording the container node position data. The device can then turn on its radio receiver/transmitter and attempt to connect one of the pre-configured WPANs on the corresponding vessel by transmitting the GPS-recorded position. In exemplary embodiments, the particular pre-configured WPANs that a tracking device is configured to connect to can be determined at the time the tracking device is configured for use in a specific shipping trip.

In exemplary embodiments, a tracking device's WPAN-enabled radio can be activated by some external event, such as a detected shock or acceleration in combination with a GPS-determined position that is in the vicinity of the loading quay for the vessel's current leg. In other exemplary embodiments, a tracking device's WPAN-enabled radio can be configured for activation by a low-level radio signal having a designated frequency (for example, selected from a frequency spectrum range between 300-400 MHz) in a similar fashion to that of garage door opening systems. The tracking device's receiver can be permanently enabled to detect of these low-level radio signal because such an implementation is very power efficient. In exemplary embodiments, a fixed component, such as a transmission line or a pulse forming network on or near the vessel, can be configured generate the activating pulse when a container node and its tracking device enter a specified area such as, for example, the vicinity of a loading crane.

Once a tracking device's WPAN-enabled radio is activated, the device actively tries to connect to the pre-configured WPANs corresponding to the vessel onto which it should be loaded, as described above. The activated device can be configured to scan through the set of WPANs for which it has been configured, trying to connect to any of the expected WPANs. More specifically, in exemplary embodiments, newly arriving container nodes attempt to connect to one of the expected WPANs by first pinging one of the pre-configured networks according to its channel and network ID with an echo request to verify whether network connectivity can be made with the particular host. If the particular WPAN provides an echo response that indicates it has been reached by the new container node, the new container node will connect to that network. If instead, after some specified time-out or delay period without receiving an echo response, the container node will determine that the ping on the particular network ID has failed, and the node will try to ping a new pre-configured WPAN ID. The process repeats until a network connection is established or the new container node has attempted and failed to connect to a WPAN after each of the pre-configured networks have been pinged. In the exemplary embodiments, after failing to connect to each the pre-configured WPANs, the container node can make one or more subsequent attempts that are separated by a specified time-out or delay period before termination. A container node's failure to establish a connection with any of the pre-configured WPANs, combined with information that the attempts were made at the correct loading time and approximate position in the loading quay (using the tracking device's GPS unit), will indicate to the container that it is not in the appropriate location near the vessel and/or the vessel's WPAN system as expected. In exemplary embodiments, situation-specific handling of this exceptional situation can be initiated. For example, the tracking device can emit an alert that may be propagated to interested entities.

Once a tracking device has connected to one of the WPANs in the vessel system, the corresponding base station and the vessel control station will be able to communicate with the device. The vessel control station is also made aware of a new container node connecting to the network and thus can identify the container to which the tracking device is joined. In exemplary embodiments, the communication between the vessel control station and the container nodes can be used for determining whether there is mutual identification between the tracking device and the vessel to enable further detection of vessel mismatch by a container if, for instance, there happen to be multiple vessels each providing a WPAN with the identical network ID and a tracking device pings and connects to an expected network ID on an incorrect vessel. In such a situation, after the tracking device has connected to the WPAN having the expected network ID, the control station on the incorrect vessel could send an indication of its identity to the tracking device, and upon receiving the indication of the incorrect identity, the tracking device could, for example, be configured emit an alert that may be propagated to interested entities. Therefore, in exemplary embodiments, a container node is able to detect that it has been loaded onto the incorrect vessel either by failure to connect to an expected WPAN or by receiving an indication of the incorrect vessel identity.

In exemplary embodiments, each base station in a vessel WPAN system can be configured to establish the pre-configured WPAN that it coordinates. As container nodes that are being loaded onto the ship connect to a particular base station's network, the base station can perform a periodic scan of the network for nodes that have connected to the network but are not yet registered (for example, orphans). In exemplary embodiments, each base station can broadcast into the network area to reach the tracking devices of all container nodes. Upon discovery of a new container node, the base station requests that container node join the network.

In exemplary embodiments, because the WPAN system can be arranged or mapped according to protocols for a hybrid, tree-shaped mesh network topology, the network topology for the system can be self-creating and self-managing according to dynamic network contexts, container node addition, and container node removal. That is, container nodes might suddenly disappear or show up in a network resulting in a varying network topology. The WPAN implements the dynamic and ad-hoc networking mechanisms for creation and maintenance to support robust and efficient operation. During the network creation, several functions can be performed by the network participants: service/resource discovery, addressing (which could be content or capability dependent), topology creation, initial security management (for example, foundation of trusted relationships), etc. Once the network is established, specific management procedures are employed in order to maintain the network, that is, to cope with the dynamic nature of the ad hoc network. The network topology is able to reconfigure due to the mobility of the container nodes, to adapt to service requirements (for example, traffic load balance), to accept new container nodes, etc. In exemplary embodiments, these management procedures can be optimized with respect to achieving maximum power efficiency.

In exemplary embodiments, routing procedures can be implemented among the tracking devices so that the container nodes are able to act as routers. Routers are the networking device that forwards data packets along networks by using headers and forwarding tables to determine the best path to forward the packets. That is, each tracking device has WPAN routing capabilities, and the container nodes constitute the actual network to perform routing and configuration functionalities. As a result, non-leaf intermediate container nodes can act as routers, forwarding scanning requests and replies for new container nodes to their ultimate destinations. Forwarding can be directed on the basis of routing tables held in the memories of the base station and the tracking devices that maintain a record of the routes to the various network destinations. This type of infrastructure is reliable and resilient. Due to the hybrid tree-mesh topology of the self-building network, each base station can reach the tracking device of any container node in the base station's respective WPAN, including container nodes that are not in direct communication with the base-station. Each container node needs only to transmit as far as the next neighboring container node. In exemplary embodiments, the tracking devices of container nodes in a WPAN can be configured with some type of logical "routing" algorithm to determine the most appropriate or fastest path to its destination to use at any particular time. A base station's network can be configured such that all of the data that is transmitted between the base station and container nodes takes the shortest path (or an approximation of the shortest path) between container nodes, except in the case of a failure or break in one of the links, in which case the data takes an alternate path to the destination. If one container node drops out of the network, due to hardware failure or any other reason, its neighbors will be able to find another route because of the mesh topology and reconfigure their routing tables accordingly.

Figure 2A:
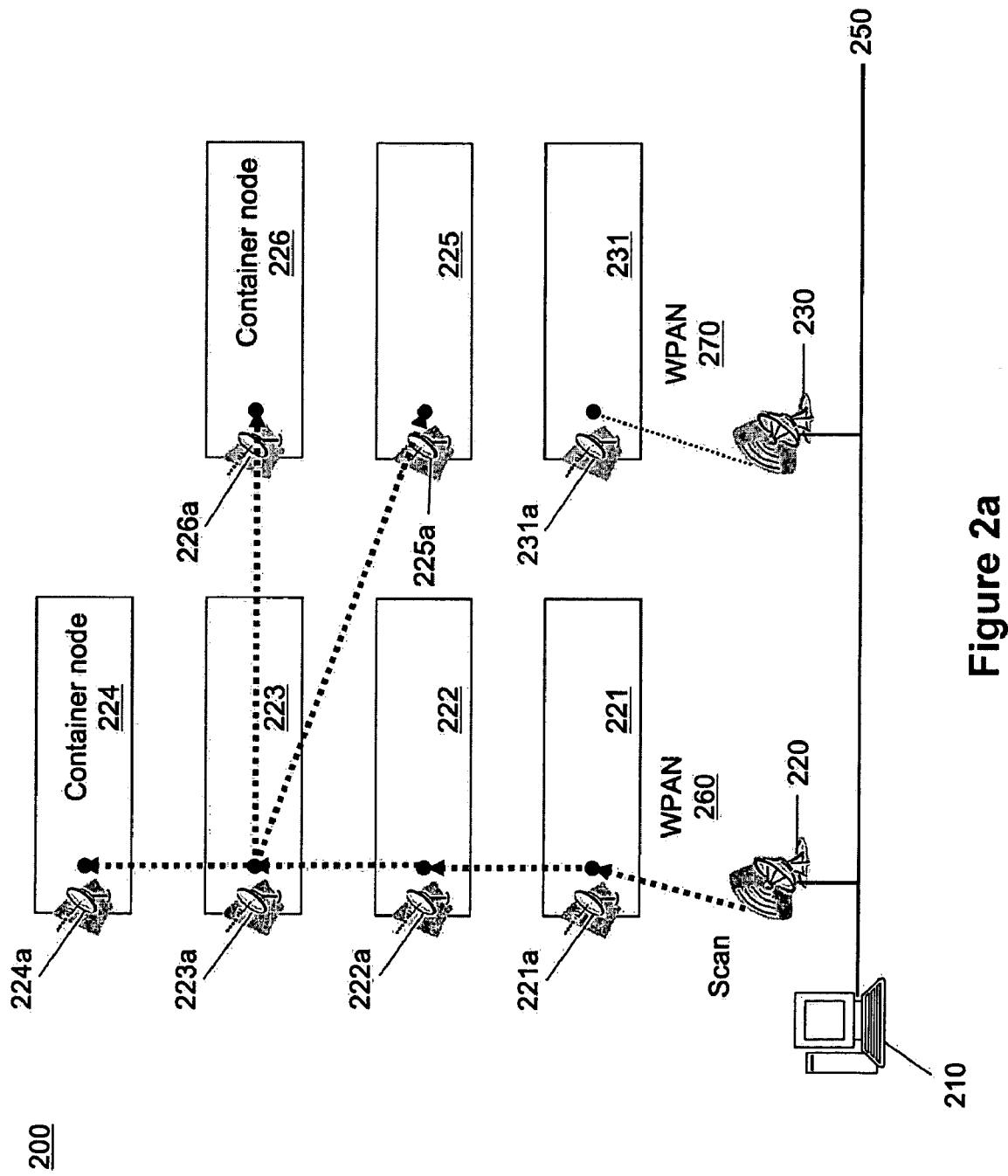
FIGS. 2a and 2b are block diagrams illustrating an example procedure of adding a new container node to a WPAN within an exemplary embodiment of a WPAN system in a shipping container environment.
Figure 2B:
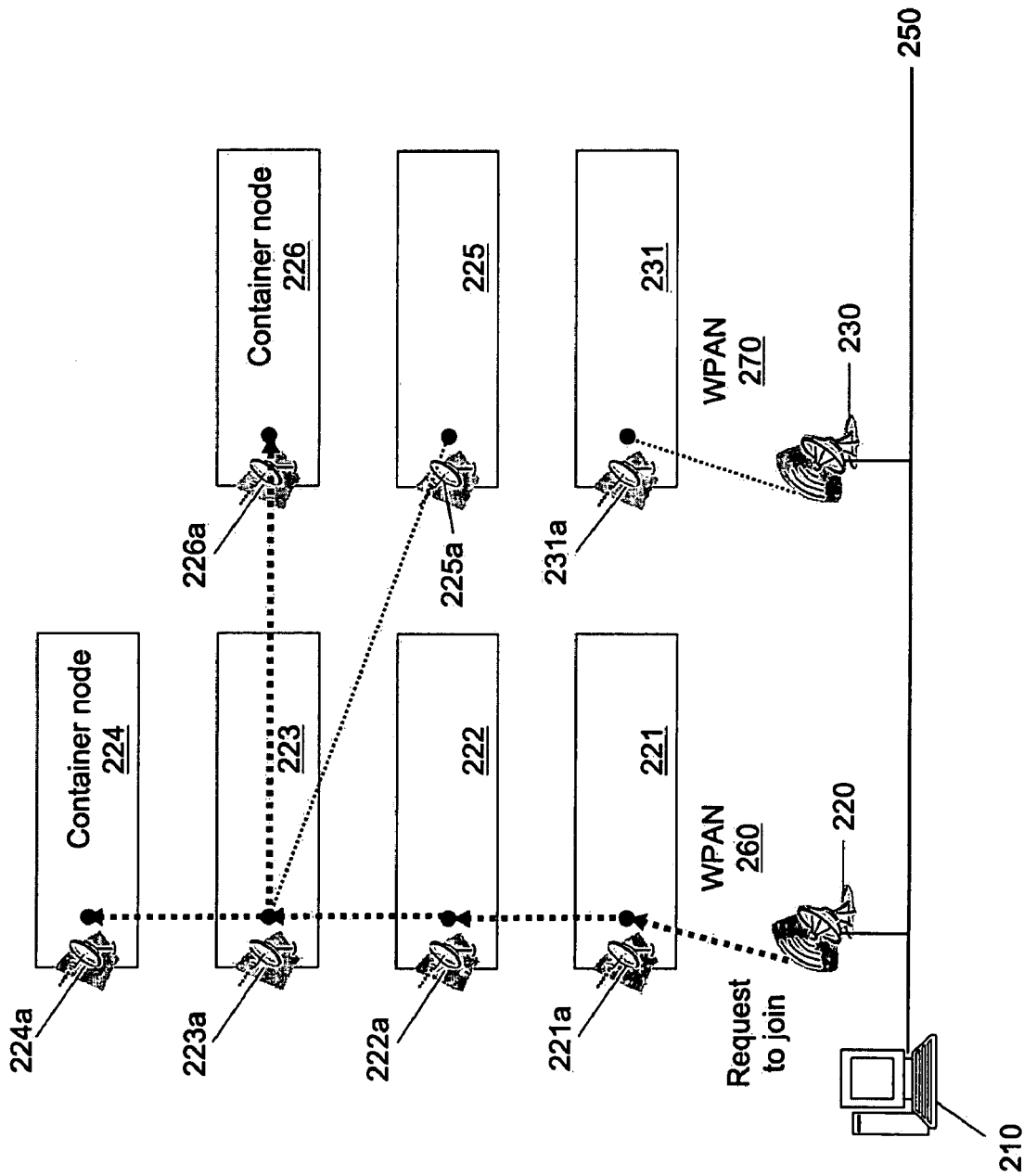

In exemplary embodiments, as container nodes are added to the network topology of a base station's WPAN, the tree-shaped network becomes established. FIGS. 2a and 2b are block diagrams illustrating an example procedure of adding a new container node to a WPAN within an exemplary embodiment of a WPAN system in a shipping container environment. As shown in FIG. 2a, WPAN system 200 includes a vessel control station 210 in communication with a number of vessel base stations 220 and 230 through a vessel local area network (LAN) 250. In exemplary embodiments, LAN 250 can consist of a vessel control station 290 and one or more vessel base stations linked to the vessel control station and also linked to each other using, for example, a router. Vessel base station 220 is in communication with containers 221, 222, 223, 224, and 225 through a first WPAN 260 and vessel base station 230 is in communication with container 231 through a second WPAN 270. WPAN system 200 also includes a new container node 226 that is configured to join WPAN 260 and has established communication with WPAN 260 by pinging the network.

In FIG. 2a of the exemplary embodiment, base station 220 is depicted performing a scan for new container nodes in WPAN 260. To do so, base station 220 broadcasts into the area of the WPAN 260 to reach container node 221. As illustrated, container node 221 receives the transmission from the base station and sends the data to container node 222, which receives the transmission and sends it to container node 223. Container node 223 then receives the transmission and sends it to container nodes 224 and 225, which branch from container node 223, as well as new container node 226. Because no further nodes neighbor or branch from container nodes 224 and 225, these nodes receive the data and do nothing with it. As shown in FIG. 2b, once new container node 226 receives the request broadcast from base station 220 to join WPAN 260, the new container node can then begin communicating with the base station and the other container nodes in the network through the same path described above so as to establish itself within the network topology as a node branching from container node 223 (along with container nodes 224 and 225). Base station 220 and the container nodes of WPAN 260 can be configured to update their routing tables accordingly.

The principle is similar to the way in which packets travel around the wired Internet—data will hop from one device to another until it reaches a given destination. In exemplary embodiments, each tracking device can be configured with dynamic routing capabilities to allow this to happen. To implement such dynamic routing capabilities, each tracking device must be able to communicate its routing information to every other tracking device to which it connects. Each tracking device then determines what to do with the data it receives—either pass it on to the next tracking device or keep it.

In exemplary embodiments, each individual container node is able to join the WPAN that it has been pre-configured to join, become established within the network topology of that WPAN, and contact and receive data from the base station through an appropriately path routed through intermediate container nodes to ensure two-way communication. In exemplary embodiments, the branching factor of the container nodes in the tree-mesh topology can be independent of the total number of container nodes in the network and, therefore, the total number of ports per container node may be kept low even when the total number of nodes is large. The use of short-range, ad hoc WPANs can thus simplify the intercommunications between the base stations and the container nodes and can extend the mobility provided by the fixed network to container nodes further out in the ad hoc domain. In exemplary embodiments, reliability of communications can be achieved using acknowledgments, retransmissions of missing and/or damaged data packets (usually initiated by time-outs), and checksums.

In exemplary embodiments, once a vessel is leaving harbor, the vessel's WPAN system can be configured so that the tracking node of each container node is put into in a low-power sleep, stand-by, or hibernate mode to prolong battery life. To initiate this transition, each base station in the vessel's WPAN system can broadcast a "request to sleep" message upon receiving a "leaving harbor dock" message from the vessel control station through the vessel local area network. Upon reception of the broadcasted request, each tracking device acknowledges the message and goes to sleep. The base stations may be configured to repeat that process until all registered tracking devices have gone to sleep. Container nodes that act as routers in the network topology of a WPAN (that is, intermediate nodes) must ensure that the tracking devices of their children container nodes go to sleep before they do.

Figure 3A:
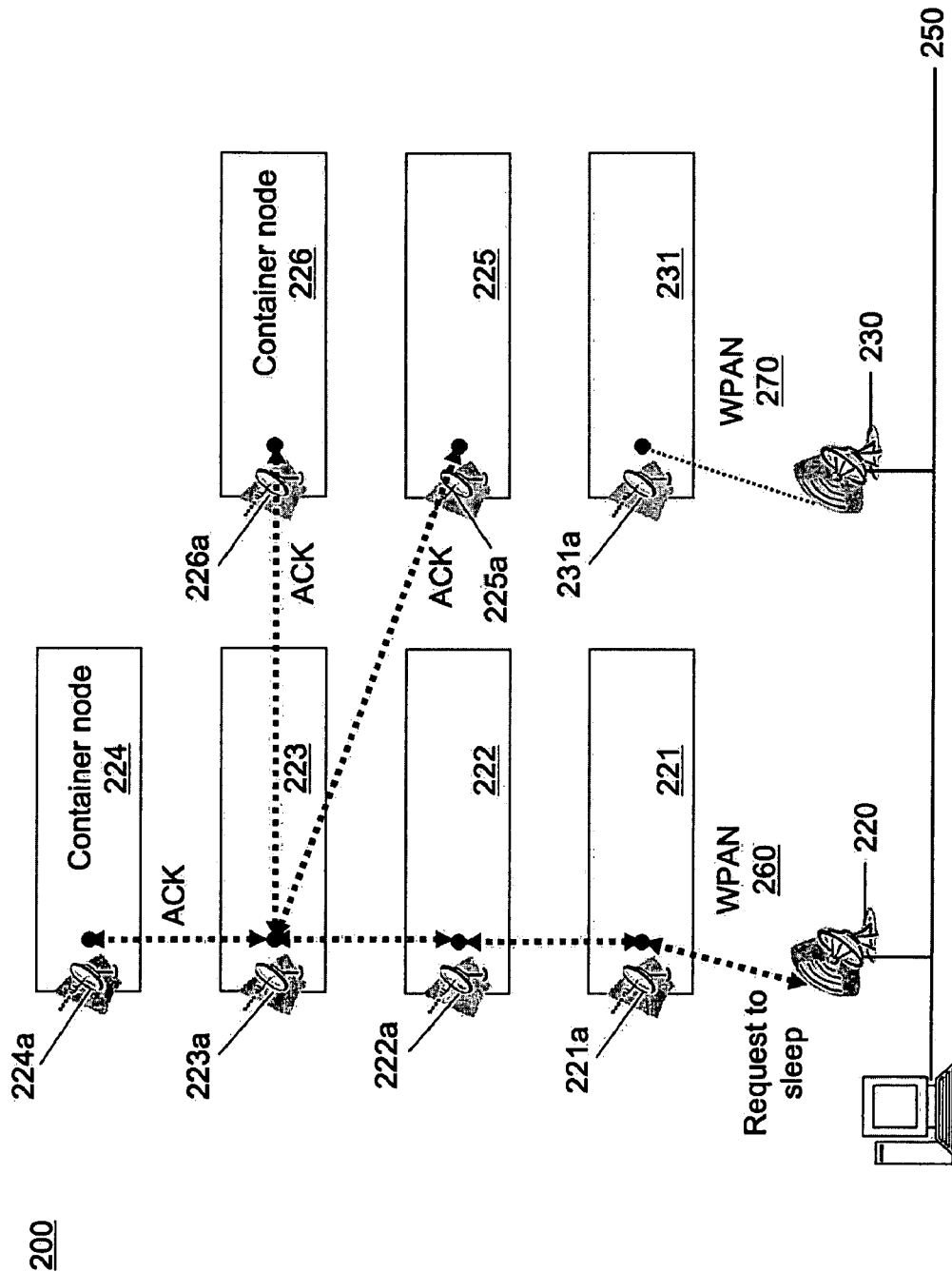

In exemplary embodiments, the container nodes can be put to sleep by performing a depth-first traversal of the mesh tree-shaped network topology using the routing tables held in the base station(s) and the container nodes. FIGS. 3a-3d are block diagrams illustrating an example procedure of performing a depth-first traversal of the exemplary WPAN system of FIG. 2b to put the container nodes of WPAN 260 into sleep mode. As shown in FIG. 3a, base station 220 broadcasts the "request to sleep" message. Container node 221 receives the message and forwards it to container node 222, which receives the message and forwards it to container node 223. Upon receiving the message, container node 223 forwards the message to its children container nodes 224, 225, and 226, and then awaits acknowledgment. Container nodes 224, 225, and 226 then provide the acknowledgement and put themselves to sleep. As shown in FIG. 3b, upon receiving the acknowledgment, container node 223 then provides an acknowledgement to neighboring container node 222 and puts itself to sleep. As shown in FIG. 3c, upon receiving the acknowledgment, container node 222 then provides an acknowledgement to neighboring container node 221 and puts itself to sleep. As shown in FIG. 3d, upon receiving the acknowledgment, container node 221 then provides an acknowledgement to base station 220 and puts itself to sleep. In a similar fashion, base station 230 broadcasts a "request to sleep" message to container node 231, which then provides an acknowledgement to base station 230 and puts itself to sleep.

In exemplary embodiments, at the completion of the ocean leg of the trip, which can be detected via a real-time clock alarm at the vessel control station, the container nodes in the vessel's WPAN system can "wake-up" to resume normal operations, and the network(s) can be re-established for further communication purposes and information exchange between the vessel control station, the base station(s), and the container nodes.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Figure 4:
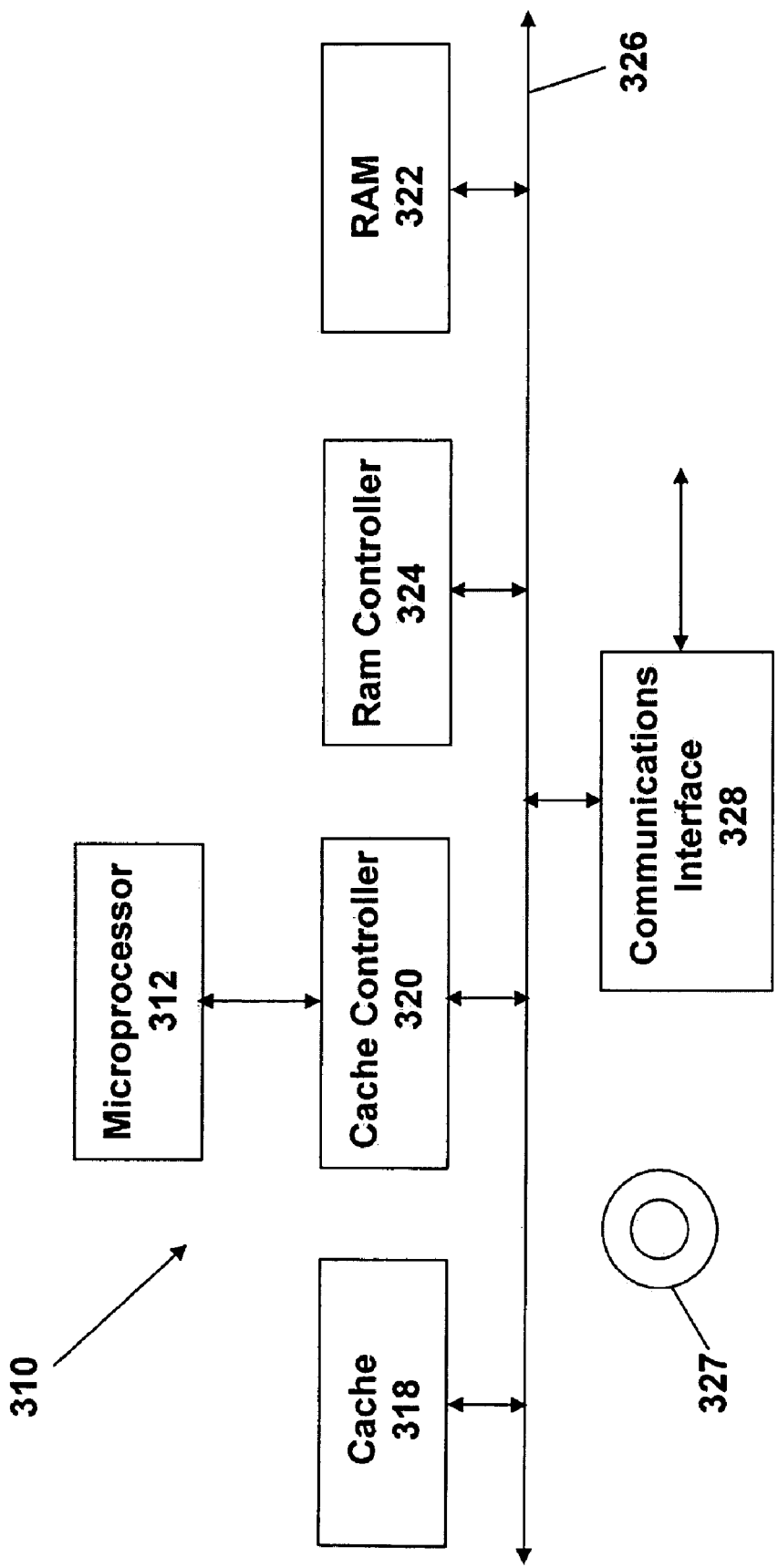
FIG. 4 is a block diagram illustrating an exemplary hardware configuration of a computer system within which aspects of exemplary embodiments of the present invention can be implemented.

For instance, exemplary embodiments of the present invention can be implemented within the exemplary embodiment of a hardware configuration provided for a computer system in FIG. 4. FIG. 4 illustrates an exemplary computer system 310 upon which exemplary embodiments of the present invention can be implemented. A processor or CPU 312 receives data and instructions for operating upon from on-board cache memory or further cache memory 318, possibly through the mediation of a cache controller 320, which can in turn receives such data from system read/write memory ("RAM") 322 through a RAM controller 324, or from various peripheral devices through a system bus 326. The data and instruction contents of RAM 322 will ordinarily have been loaded from peripheral devices such as a system disk 327. Alternative sources include communications interface 328, which can receive instructions and data from other computer systems.

The above-described program or modules implementing exemplary embodiments of the present invention can work on processor 312 and the like to perform shape interpolation. The program or modules implementing exemplary embodiments may be stored in an external storage medium. In addition to system disk 327, an optical recording medium such as a DVD and a PD, a magneto-optical recording medium such as a MD, a tape medium, a semiconductor memory such as an IC card, and the like may be used as the storage medium. Moreover, the program may be provided to computer system 310 through the network by using, as the recording medium, a storage device such as a hard disk or a RAM, which is provided in a server system connected to a dedicated communication network or the Internet.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for tracking a plurality of containers loaded onto a cargo vessel using a pre-configured low-rate wireless personal area network (WPAN), whereby each container is joined to an electronic tracking device provided with routing capabilities and a WPAN-enabled radio receiver/transmitter, and whereby each electronic tracking device is configured to attempt to connect to the WPAN upon being activated, the method comprising:

activating the radio receiver/transmitter of each electronic tracking device joined to a container of the plurality of containers as the container is being loaded onto the cargo vessel;

receiving an indication from each electronic tracking device that fails to connect to the WPAN upon being activated;

intermittently performing a network scan to locate each electronic tracking device that is connected to the WPAN;

intermittently configuring the WPAN to include each electronic tracking device that is connected to the WPAN in a hybrid tree-mesh network topology;

intermittently configuring routing information stored on each electronic tracking device that is connected to the WPAN to maintain mutual communication with each electronic tracking device that is connected to the WPAN and enable mutual communication between each electronic tracking device that is connected to the WPAN using the routing capabilities of the electronic tracking devices;

receiving GPS-recorded position data, environmental parameter data, and sensory reading data from each electronic tracking device that is connected to the WPAN;

transmitting the GPS-recorded position data, environmental parameter data, and sensory reading data to a control station of the cargo vessel through a local area network on the cargo vessel;

broadcasting a request to the WPAN to be routed between the electronic tracking devices connected to the WPAN in a depth-first traversal of the network topology, the request directing each electronic tracking device that is connected to the WPAN to enter a low-power mode when the depth-first traversal backtracks from the electronic tracking device; and receiving an acknowledgment of the request communicated from each electronic tracking device that is connected to the WPAN when the electronic tracking device enters the low-power mode.

\* \* \* \* \*